United States Patent
Delcroix et al.

(10) Patent No.: US 11,071,972 B2
(45) Date of Patent: Jul. 27, 2021

(54) COBALT CATALYST COMPRISING A SUPPORT COMPRISING A MIXED OXIDE PHASE INCLUDING COBALT AND/OR NICKEL PRODUCED FROM AN ETHER COMPOUND

(71) Applicant: IFP Energies Nouvelles, Rueil-Malmaison (FR)

(72) Inventors: Damien Delcroix, Rueil-Malmaison (FR); Manuel Corral Valero, Rueil-Malmaison (FR); Antoine Fecant, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/662,254

(22) Filed: Oct. 24, 2019

(65) Prior Publication Data
US 2020/0129969 A1 Apr. 30, 2020

(30) Foreign Application Priority Data

Oct. 25, 2018 (FR) ...................................... 1871304

(51) Int. Cl.
| | | |
|---|---|---|
| *B01J 31/02* | (2006.01) | |
| *B01J 21/04* | (2006.01) | |
| *B01J 21/12* | (2006.01) | |
| *B01J 23/00* | (2006.01) | |
| *B01J 23/75* | (2006.01) | |
| *B01J 35/02* | (2006.01) | |
| *B01J 35/10* | (2006.01) | |
| *B01J 37/02* | (2006.01) | |
| *B01J 37/08* | (2006.01) | |
| *C10G 2/00* | (2006.01) | |

(52) U.S. Cl.
CPC ........... *B01J 31/0204* (2013.01); *B01J 21/04* (2013.01); *B01J 21/12* (2013.01); *B01J 23/005* (2013.01); *B01J 23/75* (2013.01); *B01J 35/023* (2013.01); *B01J 35/1019* (2013.01); *B01J 35/1038* (2013.01); *B01J 37/0203* (2013.01); *B01J 37/0205* (2013.01); *B01J 37/0207* (2013.01); *B01J 37/0236* (2013.01); *B01J 37/088* (2013.01); *C10G 2/332* (2013.01); *C10G 2300/70* (2013.01)

(58) Field of Classification Search
CPC ............................................. B01J 37/02–0213
See application file for complete search history.

(56) References Cited

U.S. PATENT DOCUMENTS

| | | | |
|---|---|---|---|
| 2019/0126253 A1* | 5/2019 | Decottignies | ........ B01J 35/1042 |
| 2020/0047161 A1 | 2/2020 | Decottignies et al. | |

FOREIGN PATENT DOCUMENTS

| | | | |
|---|---|---|---|
| FR | 3050661 A1 | 11/2017 | |
| FR | 3050662 A1 | 11/2017 | |
| FR | 3057472 B1 | 11/2018 | |
| WO | 9315836 A1 | 8/1993 | |
| WO | 15183061 A1 | 12/2015 | |
| WO | WO-2018072921 A1 * | 4/2018 | .......... B01J 37/0236 |

OTHER PUBLICATIONS

WO2018072921A1, English translation, Apr. 26, 2018; pp. 1-30 (Year: 2018).*
Search report in corresponding FR1871304 dated Aug. 28, 2019 (pp. 1-23).

* cited by examiner

*Primary Examiner* — Medhanit W Bahta
(74) *Attorney, Agent, or Firm* — Millen White Zelano and Branigan, PC; Csaba Hunter

(57) ABSTRACT

The present invention relates to a catalyst containing an active cobalt phase, deposited on a support comprising alumina, silica or silica-alumina, said support containing a mixed oxide phase containing cobalt and/or nickel, said catalyst has been prepared by introducing at least one ether organic compound comprising not more than two ether functions and not comprising a hydroxyl group. The invention also relates to the process for the preparation thereof, and to the use thereof in the field of Fischer-Tropsch synthesis processes.

18 Claims, No Drawings

COBALT CATALYST COMPRISING A SUPPORT COMPRISING A MIXED OXIDE PHASE INCLUDING COBALT AND/OR NICKEL PRODUCED FROM AN ETHER COMPOUND

FIELD OF THE INVENTION

The invention relates to a catalyst containing an active cobalt phase, deposited on a support comprising alumina, silica or silica-alumina, said support containing a mixed oxide phase containing cobalt and/or nickel, said catalyst has been prepared by introducing at least one organic compound of the family of ethers. The invention also relates to the method for preparing same and to the use thereof in the field of Fischer-Tropsch synthesis processes.

PRIOR ART

The Fischer-Tropsch synthesis processes make it possible to obtain a wide range of hydrocarbon cuts from the $CO+H_2$ mixture, commonly referred to as synthesis gas or syngas.

The simplified stoichiometric equation (limited in the equation below to the formation of alkanes) of the Fischer-Tropsch synthesis is written:

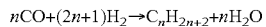

The catalysts used in Fischer-Tropsch synthesis are usually supported catalysts based on alumina, silica or silica-alumina or combinations of these supports, the active phase mainly consisting of iron (Fe) or cobalt (Co) optionally doped with a noble metal such as platinum (Pt), rhodium (Rh) or ruthenium (Ru).

The addition of an organic compound to Fischer-Tropsch catalysts to improve their activity was recommended by a person skilled in the art.

Many documents describe the use of various ranges of organic compounds as additives, such as nitrogen-containing organic compounds and/or oxygen-containing organic compounds.

In particular, U.S. Pat. Nos. 5,856,260 and 5,856,261 respectively teach the introduction, during the preparation of the catalyst, of polyols of general formula $CnH_{2n+2}O_x$ with n being an integer between 2 and around 6, and x being an integer between 2 and 11 or sugars of monosaccharide or disaccharide type, sucrose being particularly preferred.

Patent application US 2005/0026776 teaches the use of chelating compounds of the following types: nitrilotriacetic acid (NTA), trans-1,2-diaminocyclohexane-N,N,N',N'-tetraacetic acid (CyDTA) or ethylenediaminetetraacetic acid (EDTA), or else glycine, aspartic acid or citric acid for obtaining a catalyst with a reduced size of $Co_3O_4$ crystallites. Other documents teach the use of polyethers (WO 2014/092278 and WO 2015/183061), glyoxylic acid (WO 2015/183059), unsaturated dicarboxylic acids (US 2011/0028575) or else of multifunctional carboxylic acids of formula $HOOC—(CRR^1)_n—COOH$ with n≥1 in the preparation of Fischer-Tropsch catalysts (WO 98/47618).

Document WO 2012/013866 discloses the use of a cyclic oligosaccharide, in particular cyclodextrin, as additive of a Fischer-Tropsch catalyst. This document also describes the use of a support based on silica-alumina optionally containing a spinel.

Irrespective of the compounds selected, the induced modifications do not always make it possible to increase the catalyst performance enough to make the process profitable. Furthermore, it is often very complicated to carry out the industrial deployment thereof as the methods are complex to implement.

Consequently, it appears essential, for catalyst manufacturers, to find new catalysts for Fischer-Tropsch synthesis with improved performance.

AIMS AND SUMMARY OF THE INVENTION

According to a first aspect, the invention relates to a catalyst containing an active cobalt phase, deposited on a support comprising alumina, silica or silica-alumina, said support containing a mixed oxide phase containing cobalt and/or nickel, said catalyst being prepared by a process comprising at least:

a) a step of bringing a support comprising alumina, silica or silica-alumina into contact with at least one solution containing at least one precursor of cobalt and/or of nickel, then drying at a temperature below 200° C. and calcining at a temperature of between 700° C. and 1200° C., so as to obtain a mixed oxide phase containing cobalt and/or nickel in the support, then carrying out b) a step of bringing said support containing said mixed oxide phase into contact with at least one solution containing at least one precursor of cobalt, c) a step of bringing said support containing said mixed oxide phase into contact with at least one ether organic compound comprising not more than two ether functions and not comprising a hydroxyl group, steps b) and c) being able to be performed separately, in any order, or at the same time, d) then carrying out a step of drying at a temperature below 200° C.

Not one of the documents mentioned relating to the additives describes a cobalt-based catalyst deposited on a support containing a mixed oxide phase containing cobalt and/or nickel prepared using an ether organic compound comprising not more than two ether functions and not comprising a hydroxyl group.

The applicant has indeed observed that the use of such an organic compound as an organic additive during the preparation of a catalyst containing an active cobalt phase, deposited on a support comprising alumina, silica or silica-alumina, said support also containing a mixed oxide phase containing cobalt and/or nickel made it possible to obtain a catalyst for Fischer-Tropsch synthesis displaying improved catalytic performance.

Indeed, the catalyst according to the invention displays increased activity and increased selectivity relative to catalysts containing a mixed oxide phase containing cobalt and/or nickel in their support but prepared without the additivation by an ether organic compound comprising not more than two ether functions and not comprising a hydroxyl group or relative to additivated catalysts with no mixed oxide phase containing cobalt and/or nickel in the support. The use of such an organic compound during the preparation of a cobalt-based catalyst comprising a support containing a mixed oxide phase containing cobalt and/or nickel seems to have a synergistic effect on the activity and selectivity in a Fischer-Tropsch process.

Without being bound to any theory, it was demonstrated that such a catalyst has a dispersion of the cobalt that is substantially greater than that exhibited by catalysts prepared in the absence of such an organic compound. This results in the presence of a greater number of active sites for the catalysts prepared in the presence of at least one such organic compound, even if this compound is at least partially eliminated afterwards by a drying and optionally a calcining.

According to one variant, the content of mixed oxide phase in the support is between 0.1% and 50% by weight relative to the weight of the support.

According to one variant, the mixed oxide phase comprises an aluminate of formula $CoAl_2O_4$ or $NiAl_2O_4$ in the case of a support based on alumina or on silica-alumina.

According to one variant, the mixed oxide phase comprises a silicate of formula $Co_2SiO_4$ or $Ni_2SiO_4$ in the case of a support based on silica or on silica-alumina.

According to one variant, the silica content of said support is between 0.5% by weight and 30% by weight relative to the weight of the support before the formation of the mixed oxide phase when the support is a silica-alumina.

According to one variant, the ether organic compound comprising not more than two ether functions and not comprising a hydroxyl group is selected from a linear ether or a cyclic ether.

According to one variant, the ether organic compound comprising not more than two ether functions and not comprising a hydroxyl group is selected from the group of linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, or from the group of cyclic ethers consisting of tetrahydrofuran, 1,4-dioxane, and morpholine.

According to one variant, the molar ratio of ether organic compound comprising not more than two ether functions and not comprising a hydroxyl group introduced during step c) relative to the cobalt element introduced in step b) is between 0.01 mol/mol and 2.0 mol/mol.

According to one variant, the content of cobalt element introduced during step b) as active phase is between 2% and 40% by weight expressed as cobalt metal element relative to the total weight of the catalyst.

According to one variant, the catalyst further comprises an element selected from groups VIIIB, IA, IB, IIA, IIB, IIIA, IIIB and VA.

According to one variant, the catalyst further contains an additional organic compound other than the ether organic compound comprising not more than two ether functions and not comprising a hydroxyl group, said additional organic compound containing oxygen and/or nitrogen, and preferably comprising one or more chemical functions selected from a carboxylic, alcohol, ether, aldehyde, ketone, amine, nitrile, imide, oxime, urea and amide function.

According to one variant, after the drying step d), a calcining step e) is carried out at a temperature of between 200 and 550° C. in an inert atmosphere or in an oxygen-containing atmosphere.

According to one variant, the catalyst obtained in the drying step d) or obtained in the calcining step e) at a temperature of between 200° C. and 500° C., is reduced.

According to a second aspect, the invention also relates to a process for preparing the catalyst according to the invention.

According to a third aspect, the invention also relates to the use of the catalyst according to the invention in a Fischer-Tropsch synthesis process for the synthesis of hydrocarbons wherein the catalyst according to the invention or prepared in accordance with the invention is brought into contact with a feedstock comprising synthesis gas under a total pressure of between 0.1 MPa and 15 MPa, under a temperature of between 150° C. and 350° C., and at an hourly space velocity of between 100 and 20 000 volumes of synthesis gas per volume of catalyst and per hour with an $H_2/CO$ molar ratio of the synthesis gas of between 0.5 and 4.

DETAILED DESCRIPTION OF THE INVENTION

Hereinafter, groups of chemical elements are given according to the CAS classification (CRC Handbook of Chemistry and Physics, published by CRC Press, Editor in Chief D. R. Lide, $81^{st}$ edition, 2000-2001). For example, group VIII according to the CAS classification corresponds to the metals of columns 8, 9 and 10 according to the new IUPAC classification.

Textural and structural properties of the support and of the catalyst described below are determined by the characterization methods known to a person skilled in the art. The total pore volume and the pore distribution are determined in the present invention by nitrogen porosimetry as described in the book "Adsorption by powders and porous solids. Principles, methodology and applications", written by F. Rouquérol, J. Rouquérol and K. Sing, Academic Press, 1999.

The specific surface area is understood to mean the BET specific surface area ($S_{BET}$ in $m^2/g$) determined by nitrogen adsorption in accordance with standard ASTM D 3663-78 developed from the Brunauer-Emmett-Teller method described in the journal "The Journal of the American Chemical Society", 1938, 60 (309).

The catalyst according to the invention is a catalyst containing an active cobalt phase, deposited on a support comprising alumina, silica or silica-alumina, said support containing a mixed oxide phase containing cobalt and/or nickel, said catalyst being prepared by a process comprising at least:

a) a step of bringing a support comprising alumina, silica or silica-alumina into contact with at least one solution containing at least one precursor of cobalt and/or of nickel, then drying at a temperature below 200° C. and calcining at a temperature of between 700° C. and 1200° C., so as to obtain a mixed oxide phase containing cobalt and/or nickel in the support, then carrying out b) a step of bringing said support containing said mixed oxide phase into contact with at least one solution containing at least one precursor of cobalt, c) a step of bringing said support containing said mixed oxide phase into contact with at least one ether organic compound comprising not more than two ether functions and not comprising a hydroxyl group, steps b) and c) being able to be performed separately, in any order, or at the same time, d) then carrying out a step of drying at a temperature below 200° C.

The various steps of the process leading to the catalyst according to the invention are described in detail in the following paragraphs.

Said ether organic compound comprising not more than two ether functions and not comprising a hydroxyl group is described in more detail hereinafter, in relation to the description of step c).

Step a) Formation of the Mixed Oxide Phase Containing Cobalt and/or Nickel

The objective of step a) is the formation of a mixed oxide phase containing cobalt and/or nickel in a support comprising alumina, silica or silica-alumina by bringing it into contact with a solution containing at least one precursor of cobalt and/or of nickel, followed by a drying and a high-temperature calcining.

It is known that the presence of a mixed oxide phase containing cobalt and/or nickel in an alumina, silica or silica-alumina support makes it possible to improve the resistance to the phenomenon of chemical and mechanical attrition in a Fischer-Tropsch process, and therefore to stabilize the support.

The formation of the mixed oxide phase in the support, often referred to as the support stabilization step, may be carried out by any method known to a person skilled in the art. It is generally carried out by introducing cobalt and/or nickel in the form of a salt precursor, for example of nitrate type, over the initial support containing alumina, silica or silica-alumina. By calcining at very high temperature, the mixed oxide phase containing cobalt and/or nickel is formed and stabilizes the whole of the support. The cobalt and/or nickel contained in the mixed oxide phase cannot be reduced during the final activation of the Fischer-Tropsch (reduction) catalyst. The cobalt and/or nickel contained in the mixed oxide phase does (do) not therefore constitute the active phase of the catalyst.

According to step (a), a step is carried out of bringing a support comprising alumina, silica or silica-alumina into contact with at least one solution containing at least one precursor of cobalt and/or of nickel, then drying and calcining at a temperature of between 700 and 1200° C., so as to obtain a mixed oxide phase containing cobalt and/or nickel in the support.

More particularly, the contacting step a) may be carried out by impregnation, preferably dry impregnation, of a support comprising alumina, silica or silica-alumina, pre-formed or in powder form, with at least one aqueous solution containing the precursor of cobalt and/or of nickel, followed by a drying at a temperature below 200° C. and a calcining at a temperature of between 700° C. and 1200° C.

The cobalt is brought into contact with the support by means of any cobalt precursor that is soluble in the aqueous phase. Preferably, the cobalt precursor is introduced in aqueous solution, for example in nitrate, carbonate, acetate or chloride form, in the form of complexes formed with acetylacetonates or of any other inorganic derivative soluble in aqueous solution, which is brought into contact with said support. The cobalt precursor advantageously used is cobalt nitrate or cobalt acetate.

The nickel is brought into contact with the support by means of any nickel precursor that is soluble in the aqueous phase. Preferably, said nickel precursor is introduced in aqueous solution, for example in nitrate, carbonate, acetate, chloride, hydroxide, hydroxycarbonate or oxalate form, in the form of complexes formed with acetylacetonates or of any other inorganic derivative soluble in aqueous solution, which is brought into contact with said support. The nickel precursor advantageously used is nickel nitrate, nickel chloride, nickel acetate or nickel hydroxycarbonate.

The total content of cobalt and/or of nickel is advantageously between 1% and 20% by weight and preferably between 2% and 10% by weight relative to the total mass of the final support.

The drying is carried out at a temperature below 200° C., preferably at a temperature above 60° C. The drying time may range from 30 minutes to three hours.

The calcining is carried out at a temperature between 700° C. and 1200° C., preferably between 850° C. and 1200° C., and preferably between 850° C. and 900° C., generally for a period of between one hour and 24 hours and preferably between 2 hours and 5 hours. The calcining is generally carried out under an oxidizing atmosphere, for example in air, or in oxygen-depleted air; it may also be carried out at least partly under nitrogen. It makes it possible to convert the precursors of cobalt and/or of nickel and the alumina and/or silica into the mixed oxide phase containing cobalt and/or nickel.

According to one variant, the calcining may also be carried out in two steps, said calcining is advantageously carried out at a temperature between 300° C. and 600° C. in air for a period of between half an hour and three hours, and then at a temperature between 700° C. and 1200° C., preferably between 850° C. and 1200° C. and preferably between 850 and 900° C., generally for a period of between one hour and 24 hours, and preferably of between 2 hours and 5 hours.

The support comprises alumina, silica or silica-alumina.

When the support comprises alumina, it contains more than 50% by weight of alumina relative to the weight of the support before the formation of the mixed oxide phase and, preferably, it contains only alumina. The alumina may be present in a crystallographic form of gamma-, delta-, theta- or alpha-alumina type, taken alone or as a mixture.

In another preferred case, the support comprises silica. In this case, it contains more than 50% by weight of silica relative to the weight of the support before the formation of the mixed oxide phase and, preferably, it contains only silica. Sources of silicon are well known to a person skilled in the art.

In another preferred case, the support comprises a silica-alumina. A support comprising a silica-alumina is understood to mean a support in which the silicon and the aluminum are in the form of agglomerates of silica or alumina respectively, amorphous aluminosilicate or any other mixed phase containing silicon and aluminum, it being understood that the support is not mesostructured. A mesostructured support is understood to mean a support comprising pores having a uniform diameter of between 2 nm and 50 nm, preferably distributed homogeneously and regularly, also referred to as "organized" porosity at the scale of the particle. Preferably, the alumina and the silica are present in the form of a mixture of oxides $Si_2$—$Al_2O_3$. The silica content in the silica-alumina support varies from 0.5% by weight to 30% by weight, preferably from 1% by weight to 25% by weight, and more preferably still from 1.5% to 20% by weight relative to the weight of the support before the formation of the mixed oxide phase.

According to one preferred variant, the support consists, before the formation of the mixed oxide phase, of alumina, silica or silica-alumina, and particularly preferably the support consists, before the formation of the mixed oxide phase, of silica-alumina.

The support also contains a mixed oxide phase containing cobalt and/or nickel. A mixed oxide phase containing cobalt and/or nickel is understood to mean a phase in which cations of cobalt and/or of nickel are combined with the $O^{2-}$ oxide ions of the alumina and/or silica support thus forming a mixed phase containing aluminates and/or silicates containing cobalt and/or nickel. The mixed oxide phase may be in amorphous form or in crystalline form.

When the support is based on alumina, the mixed oxide phase may comprise an aluminate of formula $CoAl_2O_4$ and $NiAl_2O_4$, in amorphous or crystalline form, for example in spinel form.

When the support is based on silica, the mixed oxide phase may comprise a silicate of formula $CoSiO_4$ or $Ni_2SiO_4$ (cobalt- or nickelorthosilicate), in amorphous or crystalline form.

When the support is based on silica-alumina, the mixed oxide phase may comprise an aluminate of formula $CoAl_2O_4$ or $NiAl_2O_4$ in amorphous or crystalline form, for example in spinel form, and/or a silicate of formula $Co_2SiO_4$ or $Ni_2SiO_4$, in amorphous or crystalline form.

Generally, the content of the mixed oxide phase in the support is between 0.1% and 50% by weight relative to the support, preferably between 0.5% and 30% by weight, and more preferably between 1% and 20% by weight.

The presence of a mixed oxide phase in the catalyst according to the invention is measured by Temperature-Programmed Reduction (or TPR) such as for example described in *Oil & Gas Science and Technology, Rev. IFP, Vol.* 64 (2009), No. 1, pp. 11-12. According to this technique, the catalyst is heated in a stream of a reducing agent, for example in a stream of dihydrogen. The measurement of the dihydrogen consumed as a function of the temperature gives quantitative information regarding the reducibility of the species present. The presence of a mixed oxide phase in the catalyst is thus expressed by a consumption of dihydrogen at a temperature above around 800° C.

The support may have a morphology in the form of beads, extrudates (for example of trilobe or quadrilobe shape) or pellets, especially when said catalyst is used in a reactor operating as a fixed bed, or may have a morphology in the form of a powder of variable particle size, especially when said catalyst is used in a bubble-column (or "slurry bubble-column") reactor. The size of the grains of the catalyst may be between a few microns and a few hundred microns. For a "slurry" reactor implementation, the size of the particles of the catalyst is preferentially between 10 microns and 500 microns, preferably between 10 microns and 300 microns, very preferably between 20 microns and 200 microns, and even more preferably between 30 microns and 160 microns.

The specific surface area of the support containing the mixed oxide phase is generally between 50 $m^2/g$ and 500 $m^2/g$, preferably between 100 $m^2/g$ and 300 $m^2/g$, more preferably between 150 $m^2/g$ and 250 $m^2/g$. The pore volume of said support is generally between 0.3 ml/g and 1.2 ml/g, and preferably between 0.4 ml/g and 1 ml/g.

Thus, at the end of said step a), said support comprising alumina, silica or silica-alumina further comprises a mixed oxide phase containing cobalt and/or nickel.

Steps b) and c): Introduction of the Active Phase and Introduction of the Ether Compound After the formation of the mixed oxide phase, the following steps are carried out in the preparation of the catalyst according to the invention:

b) a step of bringing said support containing said mixed oxide phase into contact with at least one solution containing at least one precursor of cobalt, c) a step of bringing said support containing said mixed oxide phase into contact with at least one ether organic compound comprising not more than two ether functions and not comprising a hydroxyl group steps b) and c) being able to be performed separately, in any order, or at the same time.

Step b)

Step b) of bringing said support into contact with at least one solution containing at least one cobalt precursor may be carried out by any method well known to a person skilled in the art. Said step b) is preferentially carried out by impregnation of the support by at least one solution containing at least one cobalt precursor. In particular, said step b) can be achieved by dry impregnation, by excess impregnation, or else by deposition-precipitation (as described in U.S. Pat. Nos. 5,874,381 and 6,534,436) according to methods well known to a person skilled in the art. Preferably, said step b) is carried out by dry impregnation, which consists in bringing the catalyst support into contact with a solution containing at least one cobalt precursor, the volume of which is equal to the pore volume of the support to be impregnated. This solution contains the cobalt precursor at the desired concentration.

The cobalt is brought into contact with said support by means of any cobalt precursor which is soluble in the aqueous phase or in the organic phase. When introduced in organic solution, said cobalt precursor is for example cobalt acetate. Preferably, said cobalt precursor is introduced in aqueous solution, for example in nitrate, carbonate, acetate or chloride form, in the form of complexes formed with acetylacetonates or of any other inorganic derivative soluble in aqueous solution, which is brought into contact with said support. Use is advantageously made, as cobalt precursor, of cobalt nitrate or cobalt acetate.

The content of cobalt element is between 2% and 40% by weight, preferably between 5% and 30% by weight, and more preferably between 10% and 25% by weight expressed as cobalt metal element relative to the total weight of the catalyst.

The catalyst may advantageously further comprise at least one element selected from an element from groups VIIIB, IA, IB, IIA, IIB, IIIA, IIIB and/or VA. Such an element may act as cobalt promoter, making it possible to improve the activity and/or the selectivity of the catalyst.

The preferred possible elements from group VIIIB are platinum, ruthenium and rhodium. The preferred elements from group IA are sodium and potassium. The preferred elements from group IB are silver and gold. The preferred elements from group IIA are manganese and calcium. The preferred element from group IIB is zinc. The preferred elements from group IIIA are boron and indium. The preferred elements from group IIIB are lanthanum and cerium. The preferred element from group VA is phosphorus.

The content of possible element from groups VIIIB, IA, IB, IIA, IIB, IIIA, IIIB and/or VA is between 50 ppm and 20% by weight, preferably between 100 ppm and 15% by weight, and more preferably between 100 ppm and 10% by weight expressed as element relative to the total weight of the catalyst.

According to one variant, when the catalyst contains one or several additional elements from groups VIIIB, IA, IB, IIA, IIB, IIIA, IIIB and/or VA, this or these elements may be either initially present on the support before the preparation of the catalyst, or introduced at any moment of the preparation and by any method known to a person skilled in the art.

Step c)

Bringing the ether organic compound having not more than two ether functions and not comprising a hydroxyl group used for the implementation of said step c) into contact with said support is achieved by impregnation, in particular by dry impregnation or excess impregnation, preferentially by dry impregnation. Said ether organic compound is preferentially impregnated on said support after solubilization in an aqueous solution.

Said ether organic compound comprises not more than two ether functions and does not comprise a hydroxyl group. It may be selected from a linear ether or cyclic ether.

Preferably, said ether compound, that can be selected from a linear ether or cyclic ether, comprise a single ether function and does not comprise a hydroxyl group.

According to invention, one or more ether organic compounds as described below may be used for the implementation of step c).

According to one variant, said ether compound having not more than two ether functions and not comprising a hydroxyl group, introduced during step c), is selected from linear ethers of formula $R_1$—O—$R_2$, the $R_1$ and $R_2$ groups, which are identical or different, being chosen from a linear, branched or cyclic, aliphatic or aromatic hydrocarbon radical comprising from 1 to 20 carbon atoms. According to this variant, said linear ether compound is preferably selected from the list consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether.

In particular, said linear ether compound may be selected from the group of saturated linear ethers, preferably consisting of diethyl ether, dipropyl ether and dibutyl ether.

In particular, said linear ether compound may be selected from the group of saturated branched linear ethers, preferably consisting of methyl tert-butyl ether, diisopropyl ether and di-tert-butyl ether.

In particular, said linear ether compound may be selected from the group of linear ethers comprising aromatic groups, preferably consisting of methoxybenzene and phenyl vinyl ether.

In particular, said linear ether compound may be selected from the group of unsaturated linear ethers, preferably isobutyl vinyl ether.

In particular, said linear ether compound may be selected from the group of unsaturated branched linear ethers, preferably consisting of isopropyl vinyl ether and isobutyl vinyl ether.

According to one variant, said ether compound having not more than two ether functions and not comprising a hydroxyl group, introduced during step c), is selected from cyclic ethers of formula —(R—O—), the R unit being selected from a branched or unbranched hydrocarbon radical comprising from 1 to 10 carbon atoms and capable of comprising one or more heteroatoms such as oxygen or nitrogen. According to this variant, said cyclic ether compound comprises no other function involving a heteroatom. Said cyclic ether compound is preferably selected from the list consisting of ethylene oxide, 1,3-propylene oxide, tetrahydrofuran, tetrahydropyran, hexahydrooxepin, 1,4-dioxane, and morpholine. More preferentially, said cyclic ether compound is selected from the list consisting of tetrahydrofuran, 1,4-dioxane, and morpholine.

In particular, said cyclic ether compound may be selected from the group of unbranched cyclic ethers, preferably consisting of ethylene oxide, tetrahydrofuran, tetrahydropyran, and hexahydrooxepin.

In particular, said cyclic ether compound may be selected from the group of unbranched cyclic ethers comprising one or more hetero atoms such as oxygen or nitrogen, preferably consisting of 1,4-dioxane, morpholine, and N-methylmorpholine.

In particular, said cyclic ether compound may be selected from the group of branched cyclic ethers, preferably consisting of 1,3-propylene oxide, 2-methyltetrahydrofuran, 2,5-dimethyltetrahydrofuran, and 4-methyltetrahydropyran.

Preferably, said cyclic ether compound comprises a single ether function, and can be selected from the group of ethylene oxide, tetrahydrofuran, tetrahydropyran, hexahydrooxepin, morpholine, N-methylmorpholine, 1,3-propylene oxide, 2-methyltetrahydrofuran, 2,5-dimethyltetrahydrofuran, and 4-methyltetrahydropyran, and more preferably being tetrahydrofuran or morpholin.

Advantageously, the ether compound having not more than two ether functions and not comprising a hydroxyl group, introduced in step c), is selected from tetrahydrofuran, methoxybenzene, dipropyl ether and methyl tert-butyl ether.

The molar ratio of said ether compound(s) introduced during step c) relative to the cobalt element introduced in step b) is preferably between 0.01 and 2.0 mol/mol, preferably between 0.05 and 1.0.

The catalyst according to the invention may comprise, in addition to the ether organic compound, an additional organic compound or a group of organic compounds, other than the ether compound comprising not more than two ether functions and not comprising a hydroxyl group, and known for their role as additives. The function of the additives is to increase the catalytic activity relative to non-additivated catalysts. More particularly, the catalyst according to the invention may further comprise one or more oxygen-containing and/or nitrogen-containing additional organic compounds, other than the ether compound comprising not more than two ether functions and not comprising a hydroxyl group.

Generally, the additional organic compound comprises one or more chemical functions selected from a carboxylic, alcohol, ether, aldehyde, ketone, amine, nitrile, imide, oxime, urea and amide function.

The additional oxygen-containing organic compound may comprise one or more chemical functions selected from a carboxylic, alcohol, ether, aldehyde or ketone function. By way of example, the oxygen-containing organic compound may be selected from the group consisting of ethylene glycol, diethylene glycol, triethylene glycol, a polyethylene glycol (with a molecular weight between 200 and 1500 g/mol), propylene glycol, 2-butoxyethanol, 2-(2-butoxyethoxy)ethanol, 2-(2-methoxyethoxy)ethanol, triethylene glycol dimethyl ether, glycerol, acetophenone, 2,4-pentanedione, pentanone, acetic acid, maleic acid, malic acid, malonic acid, oxalic acid, gluconic acid, tartaric acid, citric acid, succinic acid, γ-ketovaleric acid, γ-valerolactone, 4-hydroxyvaleric acid, 2-pentenoic acid, 3-pentenoic acid, 4-pentenoic acid, a C1-C4 dialkyl succinate, methyl acetoacetate, dibenzofuran, a crown ether, orthophthalic acid and glucose.

The additional nitrogen-containing organic compound may comprise one or more chemical functions selected from an amine or nitrile function. By way of example, the nitrogen-containing organic compound may be selected from the group consisting of ethylenediamine, diethylenetriamine, hexamethylenediamine, triethylenetetramine, tetraethylenepentamine, pentaethylenehexamine, acetonitrile, octylamine, guanidine or a carbazole.

The additional organic compound containing oxygen and nitrogen may comprise one or more chemical functions selected from a carboxylic, alcohol, ether, aldehyde, ketone, amine, nitrile, imide, amide, urea or oxime function. By way of example, the organic compound containing oxygen and nitrogen may be selected from the group consisting of 1,2-cyclohexanediaminetetraacetic acid, monoethanolamine (MEA), N-methylpyrrolidone, dimethylformamide, ethylenediaminetetraacetic acid (EDTA), alanine, glycine, proline, lysine, nitrilotriacetic acid (NTA), N-(2-hydroxyethyl)ethylenediamine-N,N',N'-triacetic acid (HEDTA), diethylenetriaminepentaacetic acid (DPTA), tetramethylurea, glutamic acid, dimethylglyoxime, bicine or tricine, or else a lactam.

The total molar ratio of additional oxygen-containing and/or nitrogen-containing organic compound(s) other than the ether compound comprising not more than two ether functions and not comprising a hydroxyl group relative to the cobalt element introduced in step b) is preferably between 0.01 mol/mol and 2 mol/mol, preferably between 0.1 mol/mol and 2 mol/mol, preferably between 0.2 mol/mol and 1.5 mol/mol, calculated on the basis of the components introduced into the impregnating solution(s).

When the catalyst further contains an additional organic compound other than the ether compound comprising not more than two ether functions and not comprising a hydroxyl group, this additional organic compound may be either initially present on the support before the preparation of the catalyst, or incorporated into the catalyst at any moment of the preparation and by any method known to a person skilled in the art.

Implementations of Steps b) and c)

The process for preparing the catalyst according to the invention, in particular with respect to steps b) and c), comprises several modes of implementation. They are distinguished in particular by the moment when the organic compound is introduced, which may be carried out either at the same time as the impregnation of the cobalt of the active phase (co-impregnation) or after the impregnation of the cobalt of the active phase (post-impregnation), or before the impregnation of the cobalt of the active phase (pre-impregnation). In addition, it is possible to combine the modes of implementation.

A first mode of implementation consists in carrying out said steps b) and c) simultaneously so that said organic compound and at least said cobalt precursor present in the active phase are co-impregnated on said support (co-impregnation).

Said first mode of implementation advantageously comprises the implementation of one or more steps b). In particular, one or more steps b) advantageously precede(s) and/or follow(s) said co-impregnation step. Said first mode of implementation may comprise several co-impregnation steps.

A second mode of implementation consists in carrying out said step b) prior to said step c) (post-impregnation). In accordance with said second mode of implementation, one or more steps b) of bringing into contact at least the cobalt present in the active phase of the catalyst precede(s) said step c).

A third mode of implementation consists in carrying out said step c) prior to said step b) (pre-impregnation). Advantageously, said step c) is followed by several steps b).

When steps b) and c) are carried out separately (post-impregnation or pre-impregnation), a drying step is advantageously carried out between the impregnation steps. The intermediate drying step is carried out at a temperature below 200° C., advantageously between 50 and 180° C., preferably between 70 and 150° C., very preferably between 75 and 130° C. and optionally a maturation period was observed between the impregnation step and the intermediate drying step.

Each of the three modes of implementation described above may be carried out independently so that the catalyst according to the invention is prepared either according to said first mode of implementation, or according to said second mode of implementation or else according to said third mode of implementation. However, it may be advantageous to combine said first mode with said second mode or with said third mode: both the cobalt present in the active phase and the organic compound are deposited at least twice on the catalyst support, namely at least once by co-impregnation and at least once by successive impregnation.

Advantageously, after each impregnation step, whether this is a cobalt or organic compound impregnation step, the impregnated support is left to mature. Maturing allows the impregnation solution to be dispersed homogeneously within the support.

Any maturing step described in the present invention is advantageously carried out at atmospheric pressure, in a water-saturated atmosphere and at a temperature between 17° C. and 50° C., and preferably at room temperature. Generally, a maturing time of between ten minutes and forty-eight hours, and preferably of between thirty minutes and five hours, is sufficient. Longer periods of time are not ruled out but do not necessarily contribute an improvement.

Any impregnation solution described in the present invention may comprise any polar solvent known to a person skilled in the art. Said polar solvent used is advantageously selected from the group formed by methanol, ethanol, water, phenol, cyclohexanol, taken alone or as a mixture. Said polar solvent may also be advantageously selected from the group formed by propylene carbonate, DMSO (dimethyl sulfoxide), N-methylpyrrolidone (NMP) or sulfolane, taken alone or as a mixture. Preferably, use is made of a polar protic solvent. A list of common polar solvents and also their dielectric constant can be found in the book "Solvents and Solvent Effects in Organic Chemistry" C. Reichardt, Wiley-VCH, 3rd edition, 2003, pages 472-474. Very preferably, the solvent used is water or ethanol, and particularly preferably, the solvent is water. In one possible embodiment the solvent may be absent in the impregnation solution.

When several impregnation steps are carried out, each impregnation step is preferably followed by an intermediate drying step at a temperature below 200° C., advantageously between 50° C. and 180° C., preferably between 70° C. and 150° C., very preferably between 75° C. and 130° C. and optionally a maturation period was observed between the impregnation step and the intermediate drying step.

Drying Step d)

In accordance with the drying step d) of the implementation for the preparation of the catalyst, prepared according to at least one mode of implementation described above, the drying is carried out at a temperature below 200° C., advantageously between 50° C. and 180° C., preferably between 70° C. and 150° C., very preferably between 75° C. and 130° C. The drying step is preferentially carried out for a period of between 1 hour and 4 hours, preferably in an inert atmosphere or in an oxygen-containing atmosphere.

The drying step can be carried out by any technique known to a person skilled in the art. It is advantageously carried out at atmospheric pressure or at reduced pressure. Preferably, this step is carried out at atmospheric pressure. It is advantageously carried out in a crossed bed using hot air or any other gas. Preferably, when the drying is carried out in a fixed bed, the gas used is either air, or an inert gas such as argon or nitrogen. Very preferably, the drying is carried out in a crossed bed in the presence of nitrogen and/or air. Preferably, the drying step has a short duration of between 5 minutes and 4 hours, preferably of between 30 minutes and 4 hours and very preferably of between 1 hour and 3 hours.

According to a first variant, the drying is conducted so as to keep preferably at least 10% of the ether organic compound comprising not more than two ether functions and not comprising a hydroxyl group introduced during an impregnation step, preferably this amount is greater than 30% and even more preferably greater than 50%, calculated on the basis of the carbon remaining on the catalyst. When an organic compound containing oxygen and/or nitrogen is present other than the ether organic compound comprising not more than two ether functions and not comprising a hydroxyl group, the drying step is carried out so as to keep preferably at least 10%, preferably at least 30%, and very preferably at least 50% of the amount introduced, calculated on the basis of carbon remaining on the catalyst.

At the end of the drying step d), a dried catalyst is then obtained, which will be subjected to an activation step for the subsequent use thereof in Fischer-Tropsch synthesis.

According to another variant, at the end of the drying step d), a calcining step e) is carried out at a temperature of between 200° C. and 550° C., preferably of between 250° C. and 500° C., in an inert atmosphere (nitrogen for example) or in an oxygen-containing atmosphere (air for example). The duration of this heat treatment is generally between 0.5 hours and 16 hours, preferably between 1 hour and 5 hours. After this treatment, the cobalt of the active phase is thus in oxide form and the catalyst contains no more or very little organic compound introduced during synthesis thereof. However the introduction of the organic compound during the preparation thereof has made it possible to increase the dispersion of the active phase thus leading to a more active and/or more selective catalyst.

Activation (Reduction)

Prior to its use in the catalytic reactor and the implementation of the Fischer-Tropsch process according to the invention, the dried catalyst obtained in step d) or the calcined catalyst obtained in step e) advantageously undergoes a reductive treatment, for example with pure or dilute hydrogen, at high temperature. This treatment makes it possible to activate said catalyst and to form particles of cobalt metal in the zero-valent state. The temperature of this reductive treatment is preferentially between 200° C. and 500° C. and the duration thereof is between 2 hours and 20 hours.

This reductive treatment is carried out either in situ (in the same reactor as the one where the Fischer-Tropsch reaction is carried out according to the process of the invention), or ex situ before being loaded into the reactor.

Process for Preparing the Catalyst

The invention also relates to the process for preparing the catalyst, the steps of which have been described in detail above.

Fischer-Tropsch Process

A final subject of the invention is the use of the catalyst according to the invention in a Fischer-Tropsch synthesis process.

The Fischer-Tropsch process according to the invention leads to the production of essentially linear and saturated C5+ hydrocarbons (having at least 5 carbon atoms per molecule). The hydrocarbons produced by the process of the invention are thus essentially paraffinic hydrocarbons, the fraction of which having the highest boiling points can be converted with a high yield to middle distillates (diesel and kerosene cuts) by a hydroconversion process such as catalytic hydrocracking and/or hydroisomerization.

The feedstock used for the implementation of the process of the invention comprises synthesis gas. Synthesis gas is a mixture comprising in particular carbon monoxide (CO) and hydrogen ($H_2$) having $H_2$/CO molar ratios that may vary in a ratio of 0.5 to 4 depending on the process by which it was obtained. The $H_2$/CO molar ratio of the synthesis gas is generally close to 3 when the synthesis gas is obtained from the hydrocarbon or alcohol steam reforming process. The $H_2$/CO molar ratio of the synthesis gas is preferably of the order of 1.5 to 2 when the synthesis gas is obtained from a partial oxidation process. The $H_2$/CO molar ratio of the synthesis gas is generally close to 2.5 when it is obtained from a thermal reforming process. The $H_2$/CO molar ratio of the synthesis gas is generally close to 1 when it is obtained from a process for gasification and reforming of $CO_2$.

The catalyst used in the hydrocarbon synthesis process according to the invention may be implemented in various types of reactors, for example fixed-bed, moving-bed, ebullated-bed or else three-phase fluidized-bed reactors. The implementation of the catalyst suspended in a three-phase fluidized reactor, preferentially of bubble column type, is preferred. In this preferred implementation of the catalyst, said catalyst is divided in the form of a very fine powder, particularly of the order of a few tens of microns, this powder forming a suspension with the reaction medium. This technology is also known under the "slurry" process terminology by a person skilled in the art.

The hydrocarbon synthesis process according to the invention is performed under a total pressure of between 0.1 MPa and 15 MPa, preferably between 0.5 MPa and 10 MPa, under a temperature of between 150° C. and 350° C., preferably between 180° C. and 270° C. The hourly space velocity is advantageously between 100 and 20 000 volumes of synthesis gas per volume of catalyst and per hour (100 to 20 000 $h^{-1}$) and preferably between 400 and 10 000 volumes of synthesis gas per volume of catalyst and per hour (400 to 10 000 $h^{-1}$).

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding application No. FR 1871304, filed Oct. 25, 2018 are incorporated by reference herein.

The following examples demonstrate the gains in performance regarding the catalysts according to the invention.

EXAMPLES

Example 1 (Comparative): Catalyst A of Formula Co/$Al_2O_3$

A catalyst A comprising cobalt deposited on an alumina support is prepared by dry impregnation of an aqueous solution of cobalt nitrate so as to deposit, in two successive steps, around 10% by weight of Co on a gamma-alumina powder (PURALOX® SCCa 5/170, SASOL) having a mean particle size equal to 80 μm, a surface area of 165 m$^2$/g and a pore volume measured by nitrogen adsorption isotherm of 0.4 ml/g.

After a first dry impregnation, the solid is dried in a crossed bed at 120° C. for 3 h in air and then calcined at 400° C. for 4 h in a crossed bed under a stream of air. The intermediate catalyst contains around 6% by weight of Co. It is subjected to a second step of dry impregnation using a solution of cobalt nitrate. The solid obtained is dried in a crossed bed at 120° C. for 3 h in air and then calcined at 400° C. for 4 h in a crossed bed under a stream of air. The final catalyst A is obtained which contains 10.5% by weight of Co (in Co$_3$O$_4$ oxide form).

Example 2 (Comparative): Catalyst B of Formula Co/Al$_2$O$_3$.SiO$_2$

A catalyst B comprising cobalt deposited on a silica-alumina support is prepared by dry impregnation of an aqueous solution of cobalt nitrate so as to deposit, in one step, around 10% by weight of Co on a silica-alumina initially containing 5% by weight of SiO$_2$ and having a specific surface area of 180 m$^2$/g and a pore volume of 0.8 ml/g.

After the dry impregnation, the solid is dried in a crossed bed at 120° C. for 3 h in air and then calcined at 400° C. for 4 h in a crossed bed. The final catalyst B is obtained which contains 9.9% by weight of Co (in Co$_3$O$_4$ oxide form).

Example 3 (Comparative): Catalyst C of Formula Co/CoAl$_2$O$_4$—Al$_2$O$_3$.SiO$_2$ A catalyst C comprising cobalt deposited on a support, based on a mixed oxide phase (in spinel form) included in a silica-alumina, is prepared by dry impregnation of an aqueous solution of cobalt nitrate so as to deposit, in one step, around 10% by weight of cobalt on the support.

The spinel present in the support of the catalyst C is a simple spinel formed of cobalt aluminate, which is included in a silica-alumina containing 5% by weight of SiO$_2$, and having a specific surface area of 180 m$^2$/g and a pore volume of 0.8 ml/g. The preparation of the spinel included in the silica-alumina is carried out by dry impregnation of an aqueous solution of cobalt nitrate so as to introduce 5% by weight of Co into said silica-alumina. After drying at 120° C. for 3 hours, the solid is calcined at 850° C. for 4 hours in air. The support for the catalyst denoted by C' is formed of 5% by weight of cobalt in the form of cobalt aluminate (i.e. 15% by weight of spinel) in the silica-alumina.

The cobalt-based active phase is then deposited on said support in one step, by dry impregnation, according to a protocol that is identical to that described for the preparation of catalyst B. The drying and calcining steps are also performed under the same operating conditions as those of example 2. The concentration of cobalt in the solution of cobalt nitrate, used for the successive impregnations, is chosen in order to obtain the catalyst C with the desired final Co content.

The final catalyst C has a total cobalt content of 15.7% by weight (the content of Co present in the spinel phase being included) and a content of cobalt in Co$_3$O$_4$ oxide form of 10.7% by weight.

Example 4 (Comparative): Catalyst D of Formula Co/CoAl$_2$O$_4$—Al$_2$O$_3$.SiO$_2$ Containing Citric Acid (Co-Impregnation)

A catalyst D comprising cobalt and citric acid deposited on a support, based on a spinel included in a silica-alumina, is prepared by dry impregnation of an aqueous solution of cobalt nitrate and of citric acid so as to deposit around 10% by weight of cobalt on the support.

The cobalt-based active phase is deposited on the support C' of example 3 in one step, by dry impregnation of a solution containing cobalt nitrate and citric acid (Sigma Aldrich®, >99%) in a citric acid: Co molar ratio of 0.5. After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst D has a total cobalt content of 14.1% by weight (the content of Co present in the spinel phase being included) and a content of cobalt in Co$_3$O$_4$ oxide form of 9.1% by weight.

Example 5 (Comparative): Catalyst E of Formula Co/CoAl$_2$O$_4$—I$_2$O$_3$.SiO$_2$ Containing Citric Acid (Post-Impregnation)

A catalyst E comprising cobalt and citric acid deposited on a support, based on a spinel included in a silica-alumina, is prepared by dry impregnation of an aqueous solution of cobalt nitrate, and then of an aqueous solution of citric acid so as to deposit around 10% by weight of cobalt on the support.

The cobalt-based active phase is deposited on the support C' of example 3 in one step, by dry impregnation of a solution containing cobalt nitrate. After dry impregnation, the solid undergoes drying in a crossed bed at 120° C. for 3 h in air.

In a second step, the citric acid is deposited on the preceding solid in one step, by dry impregnation of a solution containing citric acid (Sigma Aldrich®, >99%) at a concentration for attaining a citric acid: Co molar ratio of 0.5 on the final catalyst. After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst E has a total cobalt content of 14.0% by weight (the content of Co present in the spinel phase being included) and a content of cobalt in Co$_3$O$_4$ oxide form of 9.0% by weight.

Example 6 (According to the Invention): Catalyst F of Formula Co/CoAl$_2$O$_4$—Al$_2$O$_3$.SiO$_2$ Containing Tetrahydrofuran A catalyst F comprising cobalt and tetrahydrofuran deposited on a support, based on a spinel included in a silica-alumina, is prepared by dry impregnation of an aqueous solution of cobalt nitrate, and then of an ethanolic solution of tetrahydrofuran so as to deposit around 10% by weight of cobalt on the support.

The cobalt-based active phase is deposited on the support C' of example 3 in one step, by dry impregnation of a solution containing cobalt nitrate. After dry impregnation, the solid undergoes drying in a crossed bed at 120° C. for 3 h in air.

In a second step, the tetrahydrofuran is deposited on the preceding solid in one step, by dry impregnation of an ethanolic solution containing tetrahydrofuran (Sigma Aldrich®, >99.9%) at a concentration for attaining a tetrahydrofuran: Co molar ratio of 0.5 on the final catalyst. After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst F has a total cobalt content of 14.6% by weight (the content of Co present in the spinel phase being included) and a content of cobalt in $Co_3O_4$ oxide form of 9.6% by weight.

Example 7 (According to the Invention): Catalyst G of Formula Co/CoAl₂O₄—Al₂O₃.SiO₂ Containing Methoxybenzene A catalyst G comprising cobalt and methoxybenzene deposited on a support, based on a spinel included in a silica-alumina, is prepared by dry impregnation of an aqueous solution of cobalt nitrate, and then of an ethanolic solution of methoxybenzene so as to deposit around 10% by weight of cobalt on the support.

The cobalt-based active phase is deposited on the support C' of example 3 in one step, by dry impregnation of a solution containing cobalt nitrate. After dry impregnation, the solid undergoes drying in a crossed bed at 120° C. for 3 h in air.

In a second step, the methoxybenzene is deposited on the preceding solid in one step, by dry impregnation of an ethanolic solution containing methoxybenzene (Sigma Aldrich®, >99.7%) at a concentration for attaining a methoxybenzene: Co molar ratio of 0.5 on the final catalyst. After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst G has a total cobalt content of 14.9% by weight (the content of Co present in the spinel phase being included) and a content of cobalt in $Co_3O_4$ oxide form of 9.9% by weight.

Example 8 (According to the Invention): Catalyst H of Formula Co/CoAl₂O₄—Al₂O₃.SiO₂ Containing Dipropyl Ether A catalyst H comprising cobalt and dipropyl ether deposited on a support, based on a spinel included in a silica-alumina, is prepared by dry impregnation of an aqueous solution of cobalt nitrate, and then of an ethanolic solution of dipropyl ether so as to deposit around 10% by weight of cobalt on the support.

The cobalt-based active phase is deposited on the support C' of example 3 in one step, by dry impregnation of a solution containing cobalt nitrate. After dry impregnation, the solid undergoes drying in a crossed bed at 120° C. for 3 h in air.

In a second step, the dipropyl ether is deposited on the preceding solid in one step, by dry impregnation of an ethanolic solution containing dipropyl ether (Sigma Aldrich®, >99%) at a concentration for attaining a dipropyl ether: Co molar ratio of 0.5 on the final catalyst. After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst H has a total cobalt content of 14.6% by weight (the content of Co present in the spinel phase being included) and a content of cobalt in $Co_3O_4$ oxide form of 9.6% by weight.

Example 9 (According to the Invention): Catalyst I of Formula: Co/CoAl₂O₄—Al₂O₃.SiO₂ Containing methyl tert-butyl ether A catalyst I comprising cobalt and methyl tert-butyl ether deposited on a support, based on a spinel included in a silica-alumina, is prepared by dry impregnation of an aqueous solution of cobalt nitrate and then, of an ethanolic solution of methyl tert-butyl ether, so as to deposit around 10% by weight of cobalt on the support.

The cobalt-based active phase is deposited on the support C' of example 3 in one step, by dry impregnation of a solution containing cobalt nitrate. After dry impregnation, the solid undergoes drying in a crossed bed at 120° C. for 3 h in air.

In a second step, the methyl tert-butyl ether is deposited on the preceding solid in one step, by dry impregnation of an ethanolic solution containing methyl tert-butyl ether (Sigma Aldrich®, >99.8%) at a concentration for attaining a methyl tert-butyl ether: Co molar ratio of 0.5 on the final catalyst.

After dry impregnation, the solid undergoes a maturation in a water-saturated atmosphere for 9 hours at room temperature and then is dried in a crossed bed at 120° C. for 3 h in air, and then treated under nitrogen at 400° C. for 4 h in a crossed bed.

The final catalyst I has a total cobalt content of 14.7% by weight (the content of Co present in the spinel phase being included) and a content of cobalt in $Co_3O_4$ oxide form of 9.7% by weight.

Example 10 (According to the Invention): Catalyst J of Formula Co/CoAl₂O₄—Al₂O₃.SiO₂ Containing Methoxybenzene The catalyst J is prepared in a manner similar to the catalyst G except that it does not undergo a heat treatment under nitrogen at 400° C. at the end of the preparation.

Example 11: Catalytic Performance of Catalysts A to J in Fischer-Tropsch Reaction The catalysts A, B, C, D, E, F, G, H, I, and J, before being tested in Fischer-Tropsch synthesis, are reduced in situ under a stream of pure hydrogen at 400° C. for 16 hours. The Fischer-Tropsch synthesis reaction is performed in a fixed-bed tubular reactor operating continuously.

Each of the catalysts is in powder form with a diameter of between 40 microns and 150 microns.

The test conditions are as follows:
Temperature=216° C.
Total pressure=2 MPa
Hourly space velocity (HSV)=4100 NL/h⁻¹/kg catalyst
$H_2$/CO molar ratio=2/1

The results, expressed in terms of activity (conversion of CO in %) and selectivity (weight percentage of $C_{8+}$ hydrocarbons over all of the products formed), appear in table 1.

| Catalyst | Conversion of CO at 70 h under reaction stream (%) | $C_8^+$ selectivity at 70 h under reaction stream (% by weight) |
|---|---|---|
| A (comparative) | 27.5 | 57.1 |
| B (comparative) | 38.1 | 65.9 |
| C (comparative) | 44.7 | 68.0 |
| D (comparative) | 30.8 | 53.3 |
| E (comparative) | 41.3 | 56.1 |
| F (invention) | 50.2 | 65.0 |
| G (invention) | 59.0 | 69.7 |
| H (invention) | 61.8 | 70.1 |
| I (invention) | 52.3 | 66.7 |
| J (invention) | 62.7 | 72.2 |

The results in table 1 show that the catalysts according to the invention are more active and/or more selective than the catalysts known from the prior art.

APPENDIX

The tables below list examples of ether organic compounds cited in the present description and the structural formulae thereof.

TABLE 2

| Name | Formula |
|---|---|
| diethyl ether | |
| dipropyl ether | |
| dibutyl ether | |
| methyl tert-butyl ether | |
| diisopropyl ether | |
| di-tert-butyl ether | |
| methoxybenzene | |
| phenyl vinyl ether | |
| isopropyl vinyl ether | |
| isobutyl vinyl ether | |

TABLE 3

| Name | Formula |
|---|---|
| Tetrahydrofuran | |
| 2-methyltetrahydrofuran | |
| 2,5-dimethyltetrahydrofuran | |
| tetrahydropyran | |
| 4-methyltetrahydropyran | |
| hexahydrooxepin | |
| 1,4-dioxane | |
| morpholine | |
| N-methylmorpholine | |
| ethylene oxide | |
| 1,3-propylene oxide | |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. A process for preparing a catalyst containing an active cobalt phase, deposited on a support comprising alumina, silica or silica-alumina, said support containing a mixed oxide phase containing cobalt and/or nickel, comprising at least
- a) a step of bringing a support comprising alumina, silica or silica-alumina into contact with at least one solution containing at least one precursor of cobalt and/or of nickel, then drying at a temperature below 200° C. and calcining at a temperature of between 700° C. and 1200° C., to obtain a mixed oxide phase containing cobalt and/or nickel in the support, then carrying out
- b) a step of bringing said support containing said mixed oxide phase into contact with at least one solution containing at least one precursor of cobalt,
- c) a step of bringing said support containing said mixed oxide phase into contact with at least one ether organic compound comprising not more than two ether functions and not comprising a hydroxyl group selected from the group of linear ethers consisting of diethyl ether, dipropyl ether, dibutyl ether, methyl tert-butyl ether, diisopropyl ether, di-tert-butyl ether, methoxybenzene, phenyl vinyl ether, isopropyl vinyl ether and isobutyl vinyl ether, steps b) and c) being able to be performed separately, in any order, or at the same time, then carrying out
- d) a step of drying at a temperature below 200° C.

2. The process according to claim 1, wherein the content of mixed oxide phase in the support is between 0.1% and 50% by weight relative to the weight of the support.

3. The process according to claim 1, wherein the mixed oxide phase comprises an aluminate of formula $CoAl_2O_4$ or $NiAl_2O_4$ in the case of a support based on alumina or on silica-alumina.

4. The process according to claim 1, wherein the mixed oxide phase comprises a silicate of formula $Co_2SiO_4$ or $Ni_2SiO_4$ in the case of a support based on silica or on silica-alumina.

5. The process according to claim 1, wherein the silica content of said support is between 0.5% by weight and 30% by weight relative to the weight of the support before the formation of the mixed oxide phase when the support is a silica-alumina.

6. The process according to claim 1, wherein the ether organic compound comprising not more than two ether functions and not comprising a hydroxyl group is selected from the group of linear ethers consisting of dipropyl ether, methyl tert-butyl ether and methoxybenzene.

7. The process according to claim 1, wherein the molar ratio of ether organic compound comprising not more than two ether functions and not comprising a hydroxyl group introduced during step c) relative to the cobalt element introduced in step b) is between 0.01 mol/mol and 2.0 mol/mol.

8. The process according to claim 1, wherein the content of cobalt element introduced during step b) as active phase is between 2% and 40% by weight expressed as cobalt metal element relative to the total weight of the catalyst.

9. The process according to claim 1, wherein an element of group VIIIB, IA, IB, IIA, IIB, IIIA, IIIB or VA of the periodic table has been added either before step a) to the support or during any step of the process of preparing the catalyst.

10. The process according to claim 1, wherein to the catalyst an additional organic compound other than the ether organic compound comprising not more than two ether functions and not comprising a hydroxyl group, has been added, said additional organic compound containing oxygen and/or nitrogen, and optionally comprising one or more chemical functions selected from the group consisting of a carboxylic, alcohol, ether, aldehyde, ketone, amine, nitrile, imide, oxime, urea and amide function.

11. The process according to claim 1, wherein, after the drying step d), a calcining step e) is carried out at a temperature of between 200 and 550° C. in an inert atmosphere or in an oxygen-containing atmosphere.

12. The process according to claim 11, wherein the catalyst obtained in the drying step d) or obtained in the calcining step e) at a temperature of between 200° C. and 500° C., is reduced.

13. The process according to claim 1, wherein to the catalyst an additional organic compound other than the ether organic compound comprising not more than two ether functions and not comprising a hydroxyl group, has been added, said additional organic compound containing oxygen and/or nitrogen, and comprising one or more chemical functions selected from the group consisting of a carboxylic, alcohol, ether, aldehyde, ketone, amine, nitrile, imide, oxime, urea and amide function.

14. The process according to claim 1, wherein in step a) the drying is carried out at a temperature between 60° C. and below 200° C.

15. The process according to claim 1, wherein in step a) the calcining is carried out at a temperature between 850° C. and 900° C.

16. The process according to claim 1, wherein in step a) the calcining is carried out under an oxidizing atmosphere.

17. The process according to claim 1, wherein in step d) the drying is carried out at a temperature between 50° C. and 180° C.

18. The process according to claim 1, wherein in step d) the drying is carried out at a temperature between 75° C. and 130° C.

* * * * *